(12) United States Patent
Roelleke et al.

(10) Patent No.: US 12,435,766 B2
(45) Date of Patent: Oct. 7, 2025

(54) SPRING PLATE ARRANGEMENT WITH ANTI-ROTATION MEANS AND VIBRATION DAMPER WITH THE SPRING PLATE ARRANGEMENT

(71) Applicant: ZF Friedrichshafen AG, Friedrichshafen (DE)

(72) Inventors: Hartmut Roelleke, Kircheib (DE); Mathias Balensiefer, Eitorf (DE); Alexander Au, Windeck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 411 days.

(21) Appl. No.: 18/056,374

(22) Filed: Nov. 17, 2022

(65) Prior Publication Data
US 2023/0175570 A1 Jun. 8, 2023

(30) Foreign Application Priority Data
Dec. 3, 2021 (DE) .......................... 102021213759.8

(51) Int. Cl.
*F16F 1/12* (2006.01)
*B60G 15/06* (2006.01)

(52) U.S. Cl.
CPC .............. *F16F 1/12* (2013.01); *B60G 15/063* (2013.01); *B60G 2202/312* (2013.01); *B60G 2204/1242* (2013.01); *B60G 2800/162* (2013.01); *F16F 2230/0005* (2013.01)

(58) Field of Classification Search
CPC ..................................................... F16F 9/3235
See application file for complete search history.

(56) References Cited

FOREIGN PATENT DOCUMENTS

| DE | 102010063101 A1 * | 6/2012 | ........... B60G 15/063 |
|----|----|----|----|
| JP | 2004-225 890 | 8/2004 | |
| JP | 2004225890 A * | 8/2004 | |

OTHER PUBLICATIONS

German Office Action with Search Report dated Aug. 10, 2022 from corresponding application No. DE 102021213759.8.

* cited by examiner

*Primary Examiner* — Nicole T Verley
(74) *Attorney, Agent, or Firm* — COZEN O'CONNOR

(57) ABSTRACT

A spring plate arrangement for vibration damper with damper tube, with spring plate for supporting a suspension spring, the spring plate having a contact portion circumferentially contacting a circumference of the damper tube, a receiving portion adjoining the contact portion via a shoulder and radially spaced from damper tube to form an annular space, and a supporting portion adjoining receiving portion for axially supporting the suspension spring, with a retaining ring for securing spring plate at the damper tube in an axial direction AR. The damper tube has a receiving groove arranged inside the annular space and where retaining ring is received. The retaining ring has at least one radially protruding clamping contour at its circumference which cooperates with the receiving portion in an engaging manner to secure the spring plate against rotation.

14 Claims, 2 Drawing Sheets

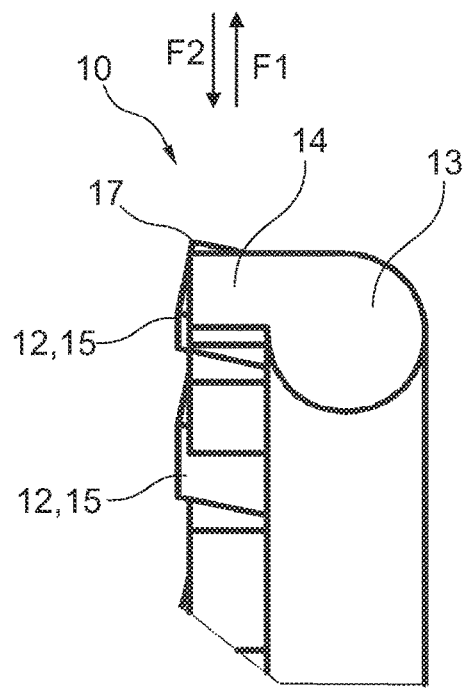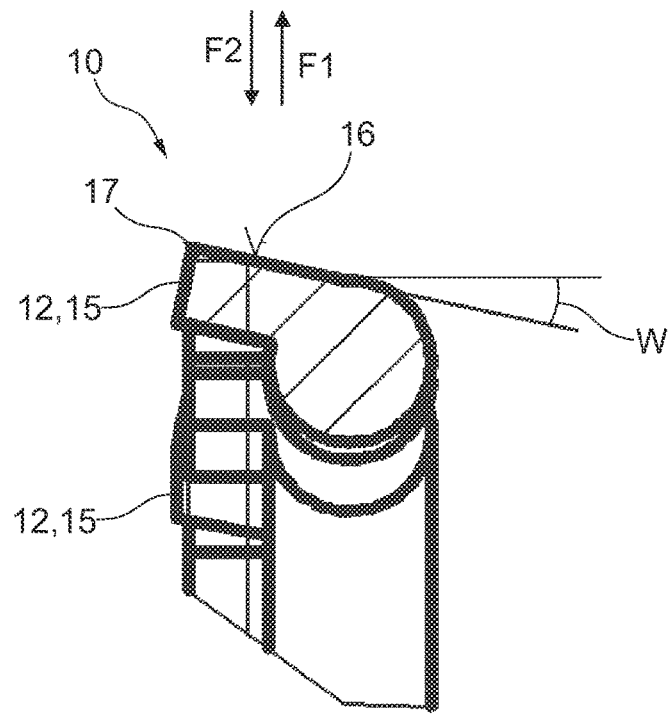
Fig. 3    Fig. 4
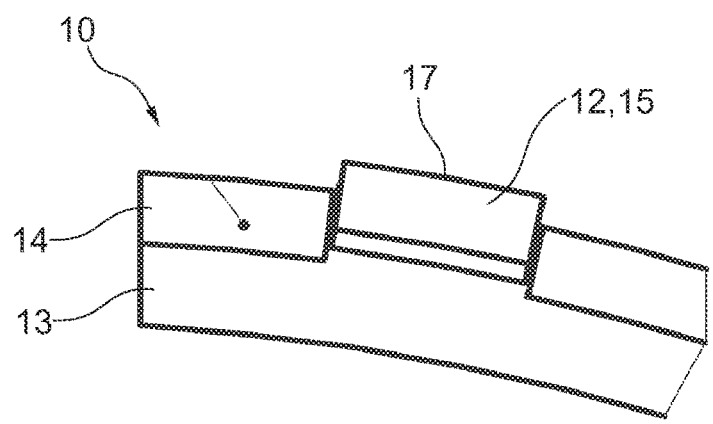
Fig. 5

SPRING PLATE ARRANGEMENT WITH ANTI-ROTATION MEANS AND VIBRATION DAMPER WITH THE SPRING PLATE ARRANGEMENT

1. FIELD OF THE INVENTION

The invention is directed to a spring plate arrangement for a vibration damper having a damper tube with a spring plate for supporting a suspension spring. The invention is also directed to a vibration damper with the disclosed spring plate arrangement.

PRIOR ART

There are known spring plates which are mounted on vibration dampers in motor vehicles to support a suspension spring at the vibration damper. The spring plate is a highly loaded component via which the vehicle weight and the dynamic loads occurring as a result of the movement of the vehicle and road irregularities are transmitted. The spring plates are usually secured at the vibration damper in axial direction via a snap ring in order to support axial loads acting on the spring plates.

DE 10 2010 063 101 A1 discloses a spring plate fastening arrangement for a vibration damper comprising a spring plate having a contact portion which surrounds a damper tube in circumferential direction, a receiving portion which is spaced axially and radially from the contact portion, and a supporting portion which is axially spaced from the contact portion. With its substantially plate-shaped radial extension, the supporting portion axially supports a suspension spring. Further, the spring plate fastening arrangement comprises a spacer element which surrounds the damper tube, is arranged in the interior of the receiving portion of the spring plate and has a first outer portion and a second outer portion, these outer portions at least partially contacting the radially inner surface of the spring plate in the receiving portion thereof by their radially outer surface. The spring plate fastening arrangement also has a middle portion which is formed axially between the two outer portions. The middle portion of the spacer element at least partially contacts the damper tube by its radially inner surface. The spring plate fastening arrangement further has a retaining element which surrounds the damper tube, is arranged radially between the damper tube and the radially inner surface of one of the outer portions of the spacer element and secures the spring plate fastening arrangement against axial loading.

SUMMARY OF THE INVENTION

The invention has the object of providing a spring plate arrangement of the type described in the introduction which is characterized by a compact construction and a secure fit on the damper tube.

The subject matter of the invention is a spring plate arrangement which is formed and/or suitable for a vibration damper. The vibration damper can be formed as a hydraulic damper or gas damper, for example. In particular, the vibration damper can be formed and/or suitable for a chassis of a vehicle.

The spring plate arrangement has a damper tube. The damper tube serves particularly to receive a damper medium, e.g., oil or gas. A piston is preferably moveably guided inside of the damper tube in axial direction with respect to a longitudinal axis via a piston rod. The damper tube is formed cylindrically at least partially or in its entirety. In principle, the vibration damper has exactly one damper tube. Alternatively, the vibration damper can have two separate damper tubes, the one damper tube preferably being arranged in the other damper tube.

The spring plate arrangement has a spring plate which is formed and/or suitable for supporting a suspension spring, particularly a helical suspension spring, at the damper tube. The spring plate preferably serves as an abutment and/or stop for the suspension spring. In particular, the spring plate is preferably arranged outside of the damper tube. The suspension spring can be formed as a coil spring or an air spring, for example, a bellows spring.

The spring plate has a contact portion which circumferentially contacts an outer circumference of the damper tube. In particular, the contact portion serves to radially support and/or center the plate spring at the damper tube. In particular, the contact portion is formed to be cylindrical or tubular and/or surrounds the damper tube in circumferential direction. The damper tube is particularly preferably received in and/or guided by the contact portion of the plate spring in a positively engaging manner at least in radial direction with reference to the longitudinal axis.

The spring plate has a receiving portion which adjoins the contact portion, particularly in axial direction, via a shoulder and is radially spaced from the damper tube so as to form an annular space. In particular, the receiving portion is arranged to be offset relative to the contact portion in radial direction via the shoulder. The annular space preferably has a constant or divergent cross-sectional shape in axial direction with reference to the longitudinal axis. In particular, the annular space is limited in radial direction by the receiving portion on the one hand and by the damper tube on the other hand. The annular space is preferably open in one axial direction and limited by the shoulder in an opposite axial direction.

Further, the spring plate has a supporting portion adjoining the receiving portion. The supporting portion is formed and/or suitable for axially supporting the suspension spring. In particular, the supporting portion serves to support the suspension spring in axial direction and optionally in radial direction. Simply stated, the supporting portion forms a spring seat for the suspension spring. The supporting portion preferably has a plate-shaped spring support which extends outward in radial direction, the suspension spring being supported at least indirectly in axial direction at the spring support.

The spring plate arrangement further has a retaining ring which is formed and/or suitable for axially securing the spring plate at the damper tube. In particular, the retaining ring serves to secure or fix the plate spring to the damper tube in axial direction in a positively engaging manner. To this end, the damper tube has a circumferential receiving groove which is arranged inside of the annular space and in which the retaining ring is received. In other words, the retaining ring forms a positively engaging stop for the spring plate, particularly the shoulder. In particular, the retaining ring is received or axially fixedly mounted in the receiving groove in a positively engaging manner at least in axial direction with reference to the longitudinal axis, the plate spring being supported at the retaining ring in axial direction. The receiving groove is preferably formed as an annular groove encircling the longitudinal axis.

It is suggested within the framework of the invention that the retaining ring has at least one or exactly one radially protruding clamping contour at its outer circumference. The clamping contour cooperates with the receiving portion in a frictionally engaging manner to secure the spring plate against rotation. Simply stated, the clamping contour serves to secure or fix the plate spring to the damper tube in a frictionally engaging manner in circumferential direction. In particular, the clamping contour is configured in such a way that a frictional engagement is generated between the clamping contour and the receiving portion when the spring plate is mounted, particularly slid onto the damper tube in axial direction. In particular, the frictional engagement is produced by jamming and/or pressing the retaining ring and the plate spring, particularly the receiving portion. In other words, a frictional engagement is understood as a connection based on a friction between the retaining ring and the spring plate.

Accordingly, there is provided a retaining ring for a spring plate which ensures a positively engaging axial securing of the spring plate and a frictionally engaging anti-rotation means for the spring plate. As a result of the combination of positively engaging and frictionally engaging connections, the spring plate can be connected to the damper tube in a simple and secure manner. Integrating the clamping contour in the retaining ring accordingly provides a spring plate arrangement characterized by a compact construction and a secure fit of the spring plate at the damper tube. For example, the positively engaging connection can fix the spring plate exclusively in axial direction, while the frictionally engaging connection also fixes the spring plate in circumferential direction.

In one embodiment, it is provided that a clamping force is transmitted in radial direction to the receiving portion via the clamping contour in a mounted state. In particular, the clamping force is generated due to a springing-elastic deformation of the retaining ring. A counterforce directed opposite the clamping force is transmitted to the retaining ring to secure the retaining ring against twisting at the damper tube. In other words, the retaining ring is pressed radially against the damper tube, particularly pressed into the receiving groove, when the spring plate is mounted so that the retaining ring is fixed in a frictionally engaging manner in circumferential direction. The counterforce is preferably to be understood as a force which is directed radially inward with reference to the longitudinal axis. Simply put, the damper tube and the spring plate are tensioned against one another by means of the retaining ring. Accordingly, there is provided a spring plate arrangement which is characterized by a substantial anti-rotation means.

In a further embodiment, it is provided that a clamping force acting on the spring plate is variable depending on a relative axial position between the retaining ring and the spring plate. Simply stated, the clamping force is increased in axial direction when the spring plate is mounted due to a springing-elastic deformation of the retaining ring. The clamping contour is preferably wedge-shaped and/or slanted. In particular, the clamping contour is accordingly pressed against an inner circumference of the receiving portion in a frictionally engaging manner when the spring plate is mounted accompanied by the action of the clamping force in radial direction, and the clamping force can be varied depending on the relative position between the receiving portion and clamping contour. Accordingly, there is provided a retaining ring which is characterized by a sturdy and secure mechanical connection of the spring plate to the damper tube and by a simplified assembly.

In a further embodiment, it is provided that the clamping contour is formed as a spring tab which is angled and/or curved relative to the outer circumference to form a slanting surface. In particular, the slanting surface serves as an insertion aid for the receiving portion when mounting the spring plate. The spring tab is preferably deformable in radial direction in a springing-elastic manner. The clamping force is preferably variable depending on the degree of deformation of the spring tab. Accordingly, by constructing the clamping contour as a spring tab, there is provided a retaining ring which ensures a frictional engagement between the spring plate and the damper tube regardless of component-related and/or temperature-dependent tolerances and at the same time allows a simple assembly of the spring plate.

In a further embodiment, the slanting surface is radially outwardly provided with an oblique angle of more than 10 degrees, preferably more than 20 degrees, in particular more than 30 degrees, measured relative to the outer circumference. The spring tab preferably has a width of less than 3 mm, preferably less than 2 mm, particularly less than 1 mm, considered in circumferential direction. Alternatively or optionally in addition, the spring tab has a length of less than 3 mm, preferably less than 2 mm, particularly less than 1 mm, considered in axial direction. The spring tab preferably has a rectangular or square shape. Accordingly, there is provided a clamping contour which can be produced in a simple manner in technical respects related to manufacturing.

In one implementation, the slanting surface is oriented to slope upward in order to form a lead-in chamfer for the receiving portion in axial direction. The spring tab preferably allows the spring plate to be axially displaceable in axial direction and blocks displacement in the opposite axial direction. In particular, the slanting surface facilitates a mounting of the spring plate in the mounting direction, i.e., particularly in axial direction. Further, by providing the clamping contour, a self-locking frictional engagement is produced when a force acts on the spring plate opposite the mounting direction, i.e., particularly in the opposite axial direction.

In another implementation, it is provided that the retaining ring has a plurality of clamping contours which are distributed so as to be spaced apart in circumferential direction at the outer circumference. The retaining ring preferably has more than ten, preferably more than thirty, particularly more than fifty, clamping contours. The clamping contours are preferably uniformly distributed and/or spaced apart in circumferential direction. In particular, the distance between two adjacent clamping contours corresponds at least or exactly to the width of a spring tab. Accordingly, there is provided a retaining ring which is characterized by a uniform distribution of clamping force over the entire circumference.

In a further embodiment, it is provided that the retaining ring has a base body portion and a longitudinal portion adjoining the base body portion in axial direction, the clamping contour being arranged at the longitudinal portion. The longitudinal portion preferably designates a cylindrical or circumferential step which adjoins the base body portion in axial direction. The longitudinal portion preferably directly adjoins the outer diameter of the base body portion. In particular, the base body portion has a round or rectangular cross-sectional profile. The longitudinal portion preferably has an elongated cross-sectional profile, an axial extension of the longitudinal profile being greater than its radial extension when viewed in cross section. The clamping contour can be produced at the longitudinal portion, for example, by cutting and/or forming. By arranging the clamping contour or spring tab, respectively, at the longitudinal portion there is provided a retaining ring which is characterized by a high stiffness and high strength.

In still another embodiment, it is provided that the base body portion is received in the receiving groove for transmitting axial force, and the longitudinal portion is received in the annular space between the damper tube and the receiving portion for the radial support of the receiving portion. In particular, the base body portion is received in the receiving groove in the mounted state in a positively engaging manner at least in axial direction. In particular, the longitudinal portion is supported at the receiving portion in the mounted state at least in radial direction via the clamping contour. In order to secure the retaining ring at the damper tube so as to be fixed with respect to relative rotation, the base body portion and/or the longitudinal portion are/is supported at the damper tube in radial direction. In particular, the support surface of the retaining ring can be enlarged by means of the longitudinal portion so that the effective frictional surface is enlarged under the action of the clamping force and the anti-rotation means of the spring plate is improved.

In a further embodiment, it is provided that the clamping contour is machined out of the longitudinal portion by punching/bending. In particular, punching/bending is a manufacturing process in which one or more deformation steps are carried out after or during a punching process. This allows a particularly efficient possibility to produce the retaining ring in one piece while forming the spring tab.

In a further implementation, it is provided that the retaining ring is discontinuous in circumferential direction and is elastically deformable in order to vary a diameter. In particular, the retaining ring is interrupted by a radially extending slit or cutout. Accordingly, there is provided a retaining ring which is characterized by a particularly simple mounting.

In a further embodiment, it is provided that the retaining ring is produced integrally. In particular, the base body portion, the longitudinal portion and the clamping contour are produced from a common material portion. The retaining ring is preferably formed as a shaped sheet metal part. Accordingly, there is provided a retaining ring which is characterized by a simple production.

The invention is further directed to a vibration damper having a particular spring plate arrangement in accordance with one or more of the above-described embodiments. The vibration damper is preferably formed and/or suitable for damping vibrations. In particular, the vibration damper can be formed and/or suitable for a chassis of a vehicle. The vibration damper can be formed optionally as a monotube damper or twin-tube damper.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF DRAWINGS

Further features, advantages and effects of the invention will become apparent from the following description of preferred exemplary embodiments of the invention. The drawings show:

FIG. 3 shows a first sectional view of the retaining ring;

FIG. 4 shows a second sectional view of the retaining ring;

FIG. 5 shows a detail view of the retaining ring.

DETAILED DESCRIPTION OF THE INVENTION

Figure 1:
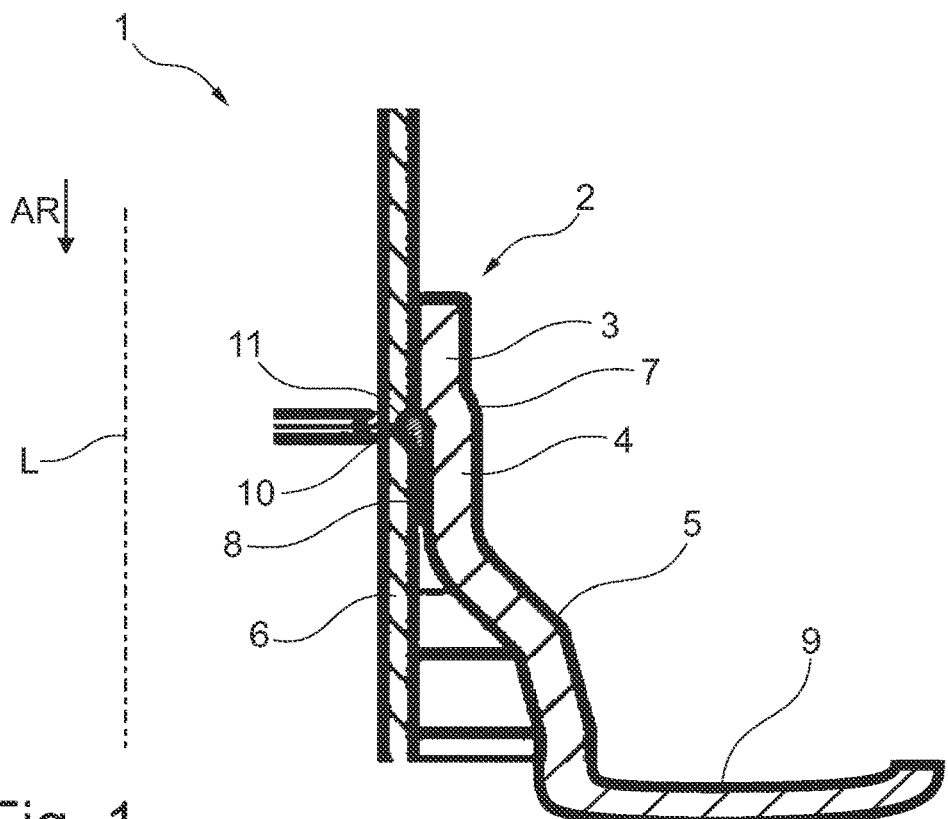
FIG. 1 shows a longitudinal section of a spring plate arrangement for a vibration damper as an exemplary embodiment of the invention.

FIG. 1 shows a schematic sectional view of a spring plate arrangement 1 for a vibration damper, not shown. The spring plate arrangement 1 has a spring plate 2 which comprises a contact portion 3, a receiving portion 4 and a supporting portion 5. The spring plate 2 is arranged outside of a cylindrical damper tube 6 of the vibration damper and serves to support a suspension spring, not shown. The damper tube 6 serves to receive a damper medium, e.g., oil or gas, and defines a longitudinal axis L along which a piston, not shown, is guided in the damper tube 6. The spring plate 3 is formed rotationally symmetrical with reference to the longitudinal axis L. The variant of the vibration damper described in FIG. 1 is a monotube damper. However, the described features, particularly the connection between the spring plate 2 and the damper tube 6, can also be transferred to other types of constructions, particularly twin-tube dampers.

The contact portion 3 circumferentially contacts the outer circumference of the damper tube 6, the spring plate 2 being radially supported or centered, respectively, at the damper tube 6 via the contact portion 3. The receiving portion 4 adjoins the contact portion 3 via a step-shaped shoulder 7 in an axial direction AR with reference to longitudinal axis L, the receiving portion 4 being spaced radially from the damper tube 3 to form an annular space 8 surrounding the longitudinal axis L. The supporting portion 5 adjoins the receiving portion 4 so as to be spaced therefrom axially and radially. The supporting portion 5 has a plate-shaped spring support 9 which extends in radial direction and supports the suspension spring in axial direction AR.

The spring plate arrangement 1 has a retaining ring 10 secured radially between the damper tube 6 and the receiving portion 4 inside of the annular space 8 in a receiving groove 11 of the damper tube 6. The receiving groove 11 is formed, for example, as an annular groove surrounding the longitudinal axis L which is incorporated in the outer circumference of the damper tube 6. The retaining ring 10 is received in the receiving groove 11 in a positively engaging manner in axial direction with reference to the longitudinal axis L, the spring plate 2 being supported in axial direction AR at the retaining ring 10. In other words, the retaining ring 10 serves to axially secure the spring plate 2 to the damper tube.

Figure 2:
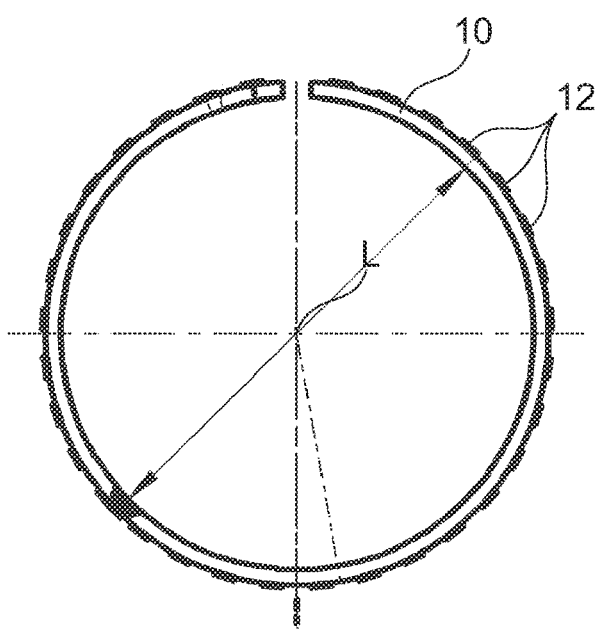
FIG. 2 shows an axial view of a retaining ring of the spring plate arrangement.

FIG. 2 shows the retaining ring 10 in an axial view with reference to the longitudinal axis L as an exemplary embodiment of the invention. The retaining ring 10 is formed discontinuous in circumferential direction such that the retaining ring 10 can be elastically deformed or widened for mounting purposes to vary its diameter. A retaining ring 10 of this type is also called a snap ring.

Further, the retaining ring 10 has at its outer circumference a plurality of clamping contours 12 which are distributed in circumferential direction so as to be uniformly spaced apart from one another over the outer circumference.

The object of the clamping contours 12 is to secure the spring plate 2 against twisting in circumferential direction on the damper tube 6 in the mounted state shown in FIG. 1. To this end, the clamping contours 12 contact an inner circumference of the receiving portion 4 in a frictionally engaging manner in radial direction with reference to the longitudinal axis L for generating a clamping force F1 between the damper tube 6 and the receiving portion 4 or for bracing the spring plate 2 and the damper tube 6 against one another.

FIGS. 3 and 4 show two different sectional views of the retaining ring 10 described in FIG. 2 along the longitudinal axis L. As is shown in FIG. 3, the retaining ring 10 has an annular base body portion 13 and a longitudinal portion 14 adjoining it in axial direction AR. In the depicted construction, the base body portion 13 has a round cross-sectional profile, the longitudinal portion 14 adjoining an outer diameter of the base body portion 13. Simply put, the longitudinal portion 14 designates a cylindrical shoulder which directly adjoins the base body portion 13 in axial direction AR.

In the mounted state, the base body portion 13 is partially received in the receiving groove 11, and the longitudinal portion 14 is arranged in the annular space 8 radially between the receiving portion 4 and the damper tube 6. The retaining ring 10 is supported at the spring plate 2 in axial direction with reference to the longitudinal axis L via the base body portion 13 and in radial direction with reference to the longitudinal axis L via the longitudinal portion 14. Further, the retaining ring 10 can contact the damper tube 6 radially via the base body portion 13 and/or the longitudinal portion 14.

The clamping contours 12 are formed as spring tabs 15 which are introduced in the longitudinal portion 14 and formed by cutting and subsequent deformation. The retaining ring 10 can be produced in one piece from a material portion, for example, in a punching/bending process. The spring tabs 15 are arranged with an oblique angle W of approximately 12 degrees relative to the outer circumference of the base body portion 13 to form a slanting surface 16 as is illustrated in FIG. 4. The slanting surfaces 16 have an ascending slope in axial direction AR. The slanting surfaces 16 serve as lead-in chamfers when mounting the spring plate 2 in axial direction.

The spring tabs 15 are formed to be springingly elastic in radial direction, and the spring tabs 16 are supported at the inner circumference of the receiving portion 4 in the mounted state in radial direction under the influence of clamping force F1. Accordingly, the clamping force F1 is seen as a spring force which is applied by means of the spring tabs 15 and which can vary depending on a relative position between the spring plate 2 and the damper tube 6. A counterforce F2 directed opposite the clamping force F1 is transmitted to the retaining ring 10 so that the base body portion 13 and/or the longitudinal portion 14 are/is pressed against the damper tube 6 in a frictionally engaging manner and accordingly secured against twisting in circumferential direction.

When mounting, the retaining ring 10 is pre-mounted at the damper tube 6 in the receiving groove 11 and the spring plate 2 is subsequently pressed on in axial direction AR. In so doing, the spring plate 2 runs against the retaining ring 10 with the receiving portion 4 via the slanting surfaces 16, the spring tabs 15 being deformed radially inward in a springing-elastic manner while generating clamping force F1. For example, the retaining ring 10 forms an axial end stop, and the spring plate 2 can be pressed in axial direction AR up to the end stop. The spring plate 2 is supported by the shoulder 7 at the retaining ring 10 in axial direction AR in a positively engaging manner and is simultaneously secured in circumferential direction in a frictionally engaging manner.

FIG. 5 shows a detail view of the retaining ring 2. The spring tabs 15 have a rectangular basic shape, and the spring tabs 15 are supported or supportable at the receiving portion 4 by an outer edge 17 so as to ensure that the spring plate 3 is displaceable in axial direction AR and so as to prevent displacement opposite the axial direction AR due to self-locking.

Accordingly, there is provided a retaining ring 10 which secures the spring plate 2 on the damper tube 6 in axial direction AR by positive engagement on the one hand and in circumferential direction by frictional engagement on the other hand, which produces a particularly secure fit for the spring plate 2. Further, there is provided a spring plate arrangement 1 which is characterized by a particularly compact and cost-effective construction.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A spring plate arrangement for a vibration damper, having a damper tube with a spring plate for supporting a suspension spring, wherein the spring plate has a contact portion which circumferentially contacts an outer circumference of the damper tube, a receiving portion having a cylindrical inner contour which adjoins the contact portion via a shoulder and is radially spaced a constant distance from the damper tube so as to form an annular space, and a supporting portion adjoining the receiving portion for axially supporting the suspension spring, with a retaining ring for securing the spring plate at the damper tube in an axial direction (AR), wherein the damper tube has a receiving groove which is arranged inside of the annular space and in which the retaining ring is received, and wherein the retaining ring has at least one radially protruding clamping contour at its outer circumference and the clamping contour cooperates with the receiving portion in a frictionally engaging manner to secure the spring plate against rotation, wherein the clamping contour is formed as a spring tab which is angled and/or curved relative to the outer circumference of the retaining ring to form a slanting surface directly between the cylindrical inner contour of the contact portion and the annular space.

2. The spring plate arrangement according to claim 1, wherein a clamping force (F1) is transmitted in radial direction to the receiving portion via the clamping contour, wherein a counterforce (F2) directed opposite the clamping force (F1) is transmitted to the retaining ring to secure the retaining ring against twisting at the damper tube.

3. The spring plate arrangement according to claim 2, wherein the clamping force (F1) is variable depending on a relative axial position between the retaining ring and the receiving portion.

4. The spring plate arrangement according to claim 1, wherein the slanting surface is radially outwardly provided with an oblique angle (W) of more than 10° relative to the outer circumference.

5. The spring plate arrangement according to claim 1, wherein the slanting surface is oriented to slope upward to form a lead-in chamfer for the receiving portion in axial direction (AR).

6. The spring plate arrangement according to claim 1, wherein the retaining ring has a plurality of clamping contours, wherein the clamping contours are distributed so as to be spaced apart in circumferential direction at the outer circumference of the retaining ring.

7. The spring plate arrangement according to claim 6, wherein the clamping contour is machined out of the longitudinal portion by punching or bending.

8. The spring plate arrangement according to claim 1, wherein the retaining ring has a base body portion and a longitudinal portion adjoining the base body portion in axial direction (AR), wherein the clamping contour is arranged at the longitudinal portion.

9. The spring plate arrangement according to claim 8, wherein the base body portion is received in the receiving groove for transmitting axial force, and the longitudinal portion is received in the annular space between the damper tube and the receiving portion for radially supporting the receiving portion.

10. The spring plate arrangement according to claim 1, wherein the retaining ring is discontinuous in circumferential direction and is elastically deformable to vary a diameter.

11. The spring plate arrangement according to claim 1, wherein the retaining ring is produced integrally from a material portion.

12. A vibration damper having the spring plate arrangement of claim 1.

13. The spring plate arrangement according to claim 1, wherein the spring tab has a length less than 3 mm.

14. The spring plate arrangement according to claim 1, wherein the spring tab has a width less than 3 mm.

* * * * *